US010674135B2

(12) United States Patent
Klusza et al.

(10) Patent No.: US 10,674,135 B2
(45) Date of Patent: Jun. 2, 2020

(54) HANDHELD PORTABLE OPTICAL SCANNER AND METHOD OF USING

(71) Applicant: DotProduct LLC, Houston, TX (US)

(72) Inventors: Mark Klusza, Houston, TX (US); Rafael Spring, Wiesbaden (DE)

(73) Assignee: DotProduct LLC, Boston, MA (US)

( * ) Notice: Subject to any disclaimer, the term of this patent is extended or adjusted under 35 U.S.C. 154(b) by 230 days.

(21) Appl. No.: 14/254,648

(22) Filed: Apr. 16, 2014

(65) Prior Publication Data

US 2014/0225985 A1     Aug. 14, 2014

Related U.S. Application Data

(63) Continuation-in-part of application No. 13/839,987, filed on Mar. 15, 2013, now Pat. No. 9,332,243.

(Continued)

(51) Int. Cl.
*H04N 13/204*      (2018.01)
*G06T 7/70*          (2017.01)
(Continued)

(52) U.S. Cl.
CPC .............. *H04N 13/204* (2018.05); *G06T 7/30* (2017.01); *G06T 7/70* (2017.01); *H04N 13/207* (2018.05);
(Continued)

(58) Field of Classification Search
USPC .......................................................... 348/46
See application file for complete search history.

(56) References Cited

U.S. PATENT DOCUMENTS 7,003,136 B1 *    2/2006   Harville ............. G06K 9/00201
                                                                  348/169
7,199,793 B2      4/2007   Oh et al.
(Continued)

FOREIGN PATENT DOCUMENTS

CN          1669045 A      9/2005
CN        101271469 A      9/2008
(Continued)

OTHER PUBLICATIONS

Tykkala, Tommi et al., "Live RGB-D Camera Tracking for Television Production Studios", conditionally accepted in Elsevier Journal of Visual Communication and Image Representation Open Access Solutions Journal of Visual Communication and Image Representation, Sep. 2012, 13 pages.*

(Continued)

*Primary Examiner* — Joseph G Ustaris
*Assistant Examiner* — Amir Shahnami

(57) ABSTRACT

A system and method for real-time or near-real time processing and post-processing of RGB-D image data using a handheld portable device including extracting gray values from the RGB-D image data, creating image pyramids from the grey values and the depth data, computing a scene fitness value using the image pyramids, predicting a camera pose and aligning the image with a first subset of selected key frames, computing a new camera pose estimate and creating a keyframe using the new camera pose estimate, after the keyframe is created, selecting a second subset of keyframes different from the first subset of keyframes and repeating the step of aligning with each keyframe of the second subset of keyframes, deciding whether new links are required to the keyframe in a keyframe pose graph and linking the keyframes.

21 Claims, 12 Drawing Sheets

System Block Diagram

Related U.S. Application Data

(60) Provisional application No. 61/812,580, filed on Apr. 16, 2013, provisional application No. 61/715,223, filed on Oct. 17, 2012.

(51) Int. Cl.
  *G06T 7/30* (2017.01)
  *H04N 13/271* (2018.01)
  *H04N 13/254* (2018.01)
  *H04N 13/207* (2018.01)

(52) U.S. Cl.
  CPC ......... *H04N 13/254* (2018.05); *H04N 13/271* (2018.05); *G06T 2200/04* (2013.01); *G06T 2200/32* (2013.01); *G06T 2207/10016* (2013.01); *G06T 2207/10024* (2013.01); *G06T 2207/10028* (2013.01); *G06T 2207/20016* (2013.01); *G06T 2207/20221* (2013.01); *G06T 2207/30244* (2013.01)

(56) References Cited

U.S. PATENT DOCUMENTS

| | | | |
|---|---|---|---|
| 8,121,350 B2 | 2/2012 | Klefenz et al. | |
| 8,731,247 B2 | 5/2014 | Pollock | |
| 8,902,254 B1 | 12/2014 | Laughlin et al. | |
| 9,332,243 B2 | 5/2016 | Klusza et al. | |
| 2004/0095357 A1 | 5/2004 | Oh et al. | |
| 2006/0110026 A1* | 5/2006 | Strassenburg-Kleciak | G01C 15/00 382/154 |
| 2007/0206204 A1 | 9/2007 | Jia et al. | |
| 2008/0012850 A1 | 1/2008 | Keating, III | |
| 2010/0008593 A1* | 1/2010 | Gruetzmacher | G06T 17/20 382/244 |
| 2011/0110560 A1* | 5/2011 | Adhikari | G06F 3/017 382/103 |
| 2011/0187829 A1 | 8/2011 | Nakajima | |
| 2012/0076403 A1 | 3/2012 | Nestares et al. | |
| 2012/0147152 A1* | 6/2012 | Vogiatis | G06T 7/0065 348/50 |
| 2012/0182393 A1 | 7/2012 | Yagi et al. | |
| 2012/0194644 A1* | 8/2012 | Newcombe | G06T 7/20 348/46 |
| 2012/0201469 A1 | 8/2012 | Livet et al. | |
| 2012/0300979 A1* | 11/2012 | Pirchheim | G06T 7/2033 382/103 |
| 2013/0002649 A1 | 1/2013 | Wu et al. | |
| 2013/0063549 A1 | 3/2013 | Schnyder et al. | |
| 2013/0147789 A1 | 6/2013 | Kim | |
| 2013/0286017 A1* | 10/2013 | Marimon Sanjuan | G06T 15/00 345/427 |
| 2013/0300740 A1 | 11/2013 | Snyder et al. | |
| 2013/0335417 A1 | 12/2013 | McQueston et al. | |
| 2014/0104387 A1 | 4/2014 | Klusza et al. | |
| 2016/0210753 A1 | 7/2016 | Klusza et al. | |

FOREIGN PATENT DOCUMENTS

| | | |
|---|---|---|
| CN | 101627635 A | 1/2010 |
| CN | 102253711 A | 11/2011 |
| CN | 102681661 A | 9/2012 |
| KR | 1020010031686 A | 4/2001 |
| WO | 2014062874 A1 | 4/2014 |
| WO | 2014172484 A1 | 10/2014 |

OTHER PUBLICATIONS

PCT/US2013/065358, International Application U.S. Appl. No. PCT/US2013/065358, International Search Report and Written Opinion dated Jan. 28, 2014, Dotproduct LLC, 15 Pages.

PCT/US2014/034406, International Application Serial No. PCT/US2014/034406, International Search Report and Written Opinion dated Aug. 25, 2014, Dotproduct LLC, 9 pages.

13848064.5, "European Application Serial No. 13848064.5, Extended European Search Report dated May 27, 2016", Dotproduct LLC, 10 Pages.

PCT/US2013/065358, "International Application Serial No. PCT/US2013/065358, International Preliminary Report on Patentability and Written Opinion dated Apr. 30, 2015", Dotproduct LLC, 10 Pages.

PCT/US2014/034406, "International Application Serial No. PCT/US2014/034406, International Preliminary Report on Patentability and Written Opinion dated Oct. 29, 2015", Dotproduct LLC, 6 Pages.

Popescu, et al., "The ModelCamera: a Hand-Held-Device for Interactive Modeling", 3-D Digital Imaging and Modeling, 2003. 3DIM 2003. Proceedings. Fourth International Conference on Oct. 6-10, pp. 285-292.

Remondino, et al., "Image-Based 3D Modelling: A Review", The Photogrammetric Record, vol. 21, No. 115, pp. 269-291.

Henry, et al., "RGB-D mapping: Using Kinect-style depth cameras for dense 3D modeling of indoor environments", DotProduct LLC, 17 Pages.

14785573.8, "European Application Serial No. 14785573.8, Extended European Search Report dated Nov. 17, 2016", DotProduct LLC, 12 Pages.

Henry, et al., "RGB-D mapping: Using Kinect-style depth cameras for dense 3D modeling of indoor environments", The International Journal of Robotics Research, vol. 31, No. 5, Feb. 10, 2012, p. 647-663.

Lieberknecht, et al., "RGB-D Camera-Based Parallel Tracking and Meshing", Oct. 26, 2011, p. 147-155.

Strasdat, et al., "Double Window Optimisation for Constant Time Visual SLAM", Nov. 6, 2011, p. 2352-2359.

\* cited by examiner

System Block Diagram

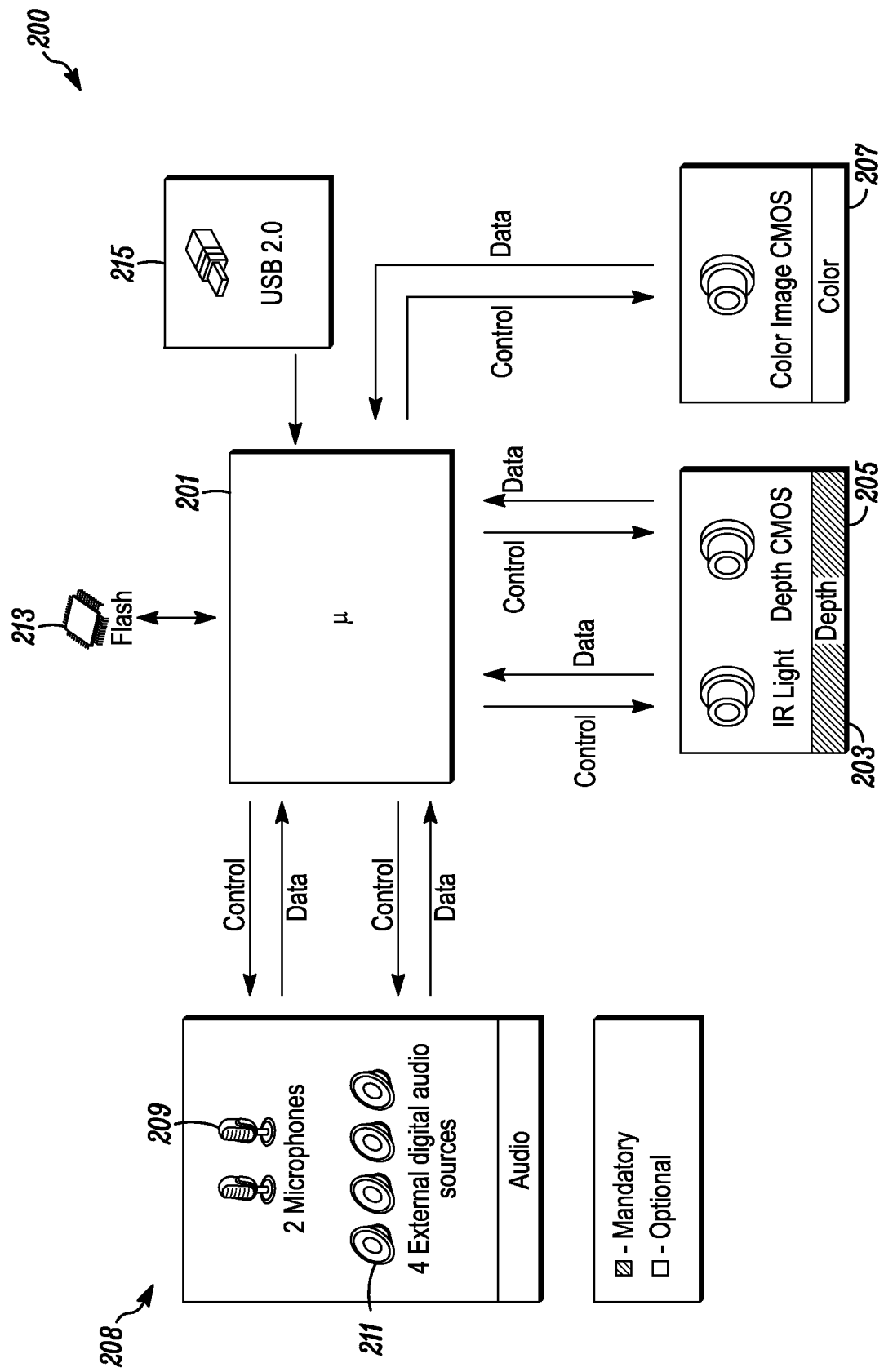
FIG. 2A  Block diagram of the components in a PrimeSense image capture and depth map determiner

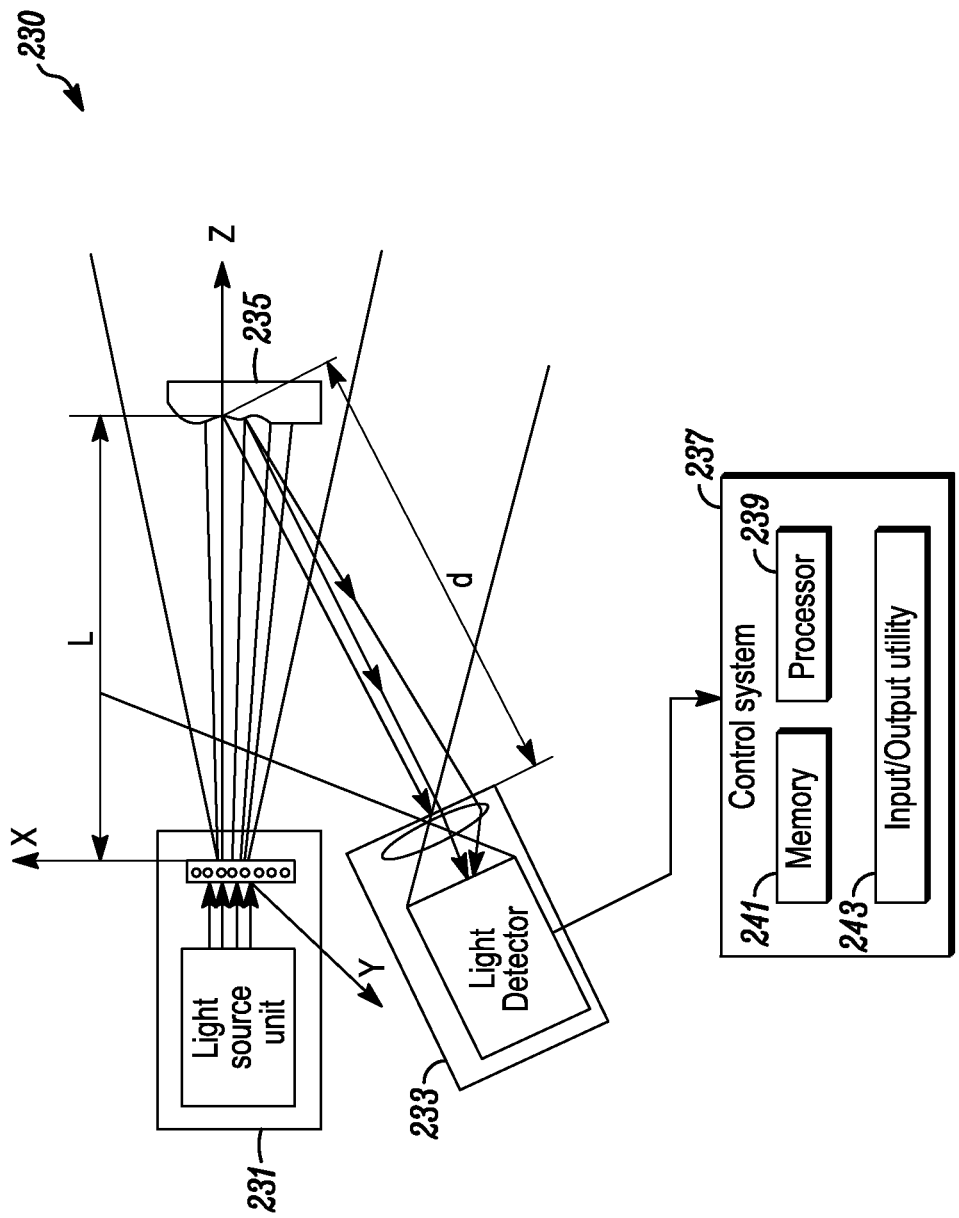
FIG. 2B Block diagram of the components in a PrimeSense image capture and depth map determiner Flowchart for internal operational steps for image capture and image processing Flowchart for internal operational steps for image capture and image processing Alternate Flow Chart for internal operational steps for image capture and image processing

| 140 | Computer Vision and Scanning Suite | 145 | Result Post - Processing |
|---|---|---|---|
| 141 | Image Capture and Pre-Processing | | |
| 142 | Real-time RGB-D Image Visualization | 190 | Imager Calibration Suite |
| 143 | Real-time alignment / 3d modeling | 191 | Calibration of projective images |
| 144 | Real-time Results Display / AR | 192 | Calibration of depth for structured light systems |
| | | | |
| 160 | Image/3d Data Management | | |
| 161 | 3D Modeler for real time display of captured image/data stream | 167 | Raw Data Transfer of Image & Depth data to remote site |
| 162 | Add virtual [AR] model from stored CAD/3D model to current scene | 168 | Geo-Reference Point Insertion into selected point in local scene |
| 163 | Shape Extractor and Exporter | 169 | New Data Addition to Current 3D Model |
| 164 | Comparer to show differences between captured image/data and model | 170 | Surface Angle Extractor |
| 165 | Scene Exporter for use in external model | 171 | Display Control for GUI |
| 166 | Real-Time Data Streaming to external viewer | 172 | Post-Capture Results Visualization |

List of programs

FIG. 5

Color / Depth Maps (as seen from keyframes)

Color / Depth Maps

3-D scene and keyframe representation

File structure illustrating compressed color and depth data

HANDHELD PORTABLE OPTICAL SCANNER AND METHOD OF USING

CLAIM TO PRIORITY

This application is a continuation-in-part of U.S. patent application Ser. No. 13/839,987, filed Mar. 15, 2013, and also claims priority to, and the benefit of, Prov. Appl. 61/812,580, of the same title, filed on Apr. 16, 2013; both of which are hereby incorporated by reference in their entirety. U.S. patent application Ser. No. 13/839,987 claims priority to, and the benefit of, Provisional Application 61/715,223, filed Oct. 17, 2012, which is also incorporated by reference in its entirety.

FIELD OF THE DISCLOSURE

The field of this disclosure is that of a system and method for obtaining image data via a handheld portable optical imaging scanner and for methods of processing the image and depth data via a variety of methods.

BACKGROUND

This technique finds its root in imaging systems.

SUMMARY

One embodiment is a handheld imaging system for capturing a multiplicity of images of a scene and determining a precise location of a plurality of points in each image in a coordinate system, in real time. The system includes an image capture device for capturing and storing a plurality of digital images, a depth computation system for deriving depth information for a plurality of arbitrary points in the images in real time, a handheld computer system having a processor, a display with user interface controls, and a communications module, wherein the processor is in communication with said image capture device and a depth computation system. The system also includes a non-transitory computer readable medium having encoded thereon a set of instructions executable by the processor to cause the image capture device, the spot location system and the communications module to perform one or more operations, the instructions including capturing a plurality of digital images in digital data of a scene and capturing a location for a plurality of points in said scene from the image capture device and from the depth computation system, storing said digital data, combining the plurality of images together to form a single 3D model, displaying the single 3D model in the mobile handheld device, and manipulating the digital file data of the single 3D model according user-based inputs to a processing and control system.

Another embodiment is a method for taking a plurality of images. The method includes steps of capturing a plurality of digital images in digital data of a scene and capturing a location for a plurality of points in said scene from the image capture device and from a spot location system, storing said digital data, combining the plurality of images together to form a single 3D model, displaying the single 3D model in the mobile handheld device, and manipulating the digital file data according user-based inputs to a processing and control system.

Yet another embodiment is a handheld imaging system for capturing a multiplicity of images of a scene and determining a precise location of a plurality of points in each image in a coordinate system, in real time. The system includes an image capture device for capturing and storing a plurality of digital images, a depth computation system for deriving depth information for a plurality of arbitrary points in the images in real time, a handheld computer system having a processor, a display with user interface controls, and a communications module, wherein the processor is in communication with said image capture device and the spot location system. The system also includes a non-transitory computer readable medium having encoded thereon a set of instructions executable by the processor to cause the image capture device, the spot location system and the communications module to perform one or more operations, the instructions for capturing a plurality of digital images in digital data of a scene and capturing a location for a plurality of arbitrary points in said scene from the image capture device and from the spot location system, storing said digital data, combining the plurality of images together to form a single 3D model, and manipulating the digital file data according user-based inputs to a processing and control system, wherein said manipulation step includes relating the camera location and pose to a real-world coordinate reference system.

Another embodiment is a method. The method includes steps of capturing an image in digital data with a camera, storing digital data of the image on a non-transitory computer readable medium, extracting gray values from image color channels of the image digital data, creating image pyramids from the grey values and from depth data of the digital data and computing a scene fitness value using the image pyramids. The method also includes steps of predicting a camera pose, aligning the image with each element of a first subset of selected keyframes, yielding an aligned pose and also yielding a quantity of poses and a corresponding quantity of overlap values with respect to the selected keyframes, computing a new camera pose estimate using the aligned image and the quantity of poses and the quantity of overlap values, and creating a keyframe from the digital data of the image using the new camera pose estimate when desired. The method also includes, after the keyframe is created, selecting a second subset of keyframes different from the first subset of keyframes and repeating the step of aligning with each keyframe of the second subset of keyframes to yield a plurality of pose values and overlap values, deciding for each element of the selected first subset of keyframes and the selected second subset of keyframes whether new links are required to the keyframe in a keyframe pose graph, and linking the keyframes.

Other embodiments of the method include a method wherein the keyframe is created upon user command from the digital image data and the camera pose equal to an identity matrix if a set of existing keyframes is empty or a camera pose equal to the estimated camera pose if the set of existing keyframes is non-empty. In another embodiment of this method, the digital image data used to create a keyframe comprises a red-green-blue- and depth-channel (RGB-D) image. Another step of the method includes requesting and loading a new digital image from the camera or from the non-transitory computer readable medium and using the new digital image to repeat the steps of the previous paragraph. Using this method, one can also represent a 3D model through a collection of spatially positioned and oriented keyframes. Another embodiment further includes correcting the digital data of the stored image for characteristics of the camera according to a camera calibration. In another embodiment, the camera pose is predicted using rotational data from the group consisting of: a visual predictor based on image optical flow; data from a digital gyroscope; a linear motion model; and a combination of these data sources. The method for representing a 3D model may further include sending data for visualization of the digital images and of the 3D model to a graphics processing unit.

In another embodiment, after the step of computing the new aligned pose, the method may include checking for a failure in alignment and if there is a failure in alignment, performing a re-localization procedure. If there is no failure in alignment, the method may further include preparing a real-time correctly oriented visualization in space of a saved 3D model for a user. In another embodiment, the method may further include computing estimates of overlap between the aligned image with a selection of keyframes to determine whether to create a new keyframe. In accomplishing this method, a decision to create a new keyframe is determined from data comprising overlap values between the aligned image and a selection of keyframes and comprising digital depth data from the selection of keyframes. In another embodiment, the method further includes reprojecting depth data from the digital image into a plurality of keyframes, each reprojection using an estimate of a relative pose resulting from an alignment step of the depth data with the keyframe and a calibration model of the camera. This method may also include recomputing depth data for a keyframe using a combination of reprojected depth data and the existing depth data of the keyframe.

In another embodiment, the method of representing a 3D model may include transforming the 3D model from a local coordinate system to another coordinate system using digital images of physical targets acquired with the image, wherein the target is selected from the group consisting of: a checkerboard target; a QR code or QR-like code; and a user-selected point. This method may further include adding, updating, differencing or refining geometry of a pre-existing 3D model with data acquired from the camera using a spatial pose of a visible target for positioning and orientating the camera in space, the visible target being also present in the 3D model, the 3D model selected from the group consisting of a plurality of digital images or keyframes, a spatial dataset and a CAD file. This method may also include a step in which a position and an orientation of the camera for the existing 3D model is determined based on a localization procedure using an alignment algorithm that minimizes geometric and photometric alignment error. In methods using a 3D model, the pre-existing 3D model may be loaded either from a digital storage medium or from another computer accessible through a computer network. In another embodiment, the method may further include appending an additional image to a set of linked keyframes, the additional image selected from the group consisting of 3D data captured with the camera; 3-D data captured by a laser scanner; and data from a 3D model or CAD software. In another embodiment in which images are represented with a 3D model, the method may further include representing the 3D model in a compressed manner by compressing digital image data of keyframes into a lossless format.

Another embodiment of the present disclosure is an apparatus. The apparatus is useful for performing the methods described above, and for collecting a plurality of spatially positioned and oriented keyframes and representing the collection of spatially positioned and oriented keyframes as a 3D model. The apparatus may include an RGB-D camera for capturing and storing a plurality of digital images, the RGB-D camera including a depth computation system for deriving depth information for a plurality of arbitrary points in the digital images in real time. The apparatus may also include a handheld computer system having a processor, a display with user interface controls, and a communications module, wherein the processor is in communication with the camera and the depth computation system and a non-transitory computer readable medium having encoded thereon a set of instructions executable by the processor to cause the RGB-D camera, the depth computation system, the handheld computer system and the communications module to perform one or more operations to gather the plurality of digital images and the depth information to form the 3D model, the 3D model suitable for presentation to a user on a user interface, the 3D model also suitable for appending additional data to update the 3D model.

Another embodiment of the present disclosure is a method. The method includes steps of capturing an image in digital data with a camera, storing the image on a non-transitory computer readable medium, correcting the stored image for characteristics of the camera, analyzing the calibrated frame and extracting scene information from the calibrated frame, determining a position and an orientation in space of the imager with respect to the image and a 3D reference frame and aligning the imager in accordance with the step of analyzing, preparing a 3D model with the image and the determined position and orientation in space, the 3D model suitable for presentation and capturing an additional image in digital data with the camera and adding data from the additional image to the 3D model. In another embodiment, the camera comprises a Red-Green-Blue-Depth imager. In another embodiment, the method further includes preprocessing the image before the step of analyzing. In another embodiment, the method includes a step of analyzing a quality of the position and orientation in space and adjusting the position and orientation in space. In yet another embodiment, the method includes generating a new 3D reference frame using the image after the step of determining. The method may also include presenting the 3D model on a user interface.

Another embodiment of the present disclosure is also a method. The method includes step of capturing an image in digital data with a camera, storing data of the image on a non-transitory computer readable medium, analyzing a calibrated frame and extracting scene information from the calibrated frame, determining a position and an orientation in space of the imager with respect to the image and a 3D reference frame and aligning the imager in accordance with the step of analyzing, preparing a 3D model with the image and the determined position and orientation in space, the 3D model suitable for presentation and capturing an additional image in digital data with the camera and adding data from the additional image to the 3D model. In another embodiment, the method includes using existing data as the 3D reference frame for orienting the image. In yet another embodiment, the method includes storing the image on a non-transitory computer readable medium at a remote location.

These examples are not intended to be limiting, but rather illustrative of the capabilities of our system.

BRIEF DESCRIPTION OF THE DRAWINGS

The disclosure and the following detailed description of certain embodiments thereof may be understood by reference to the following figures:

FIGS. 2A-2B depict system block diagrams for embodiments of components of the present disclosure including an image capture and depth map determiner.

FIG. 5 is a list of the various programs in several embodiments of the disclosure.

DETAILED DESCRIPTION OF THE DISCLOSURE

The following is a written description of the present disclosure, and of the manner and process of making and using it, in such full, clear, concise, and exact terms as to enable any person skilled in the art to which it pertains, or with which it is most nearly connected, to make and use the same, and sets forth the best mode contemplated by the inventors of carrying out the disclosure.

Image capture systems for use in documenting the as-built condition of a structure or the shape and contours of an object are well-known in the arts. However, most do not operate in real time and are not configured for intensive image manipulation in the field. This disclosure includes a portable, handheld 3D image capturing system that enables creation of ready-to-use 3D models in seconds. The system of the present disclosure provides high resolution, real-time 3D images with high frame rate of capture. Thus, it is capable of capturing scenes with moving parts, or when the image capture device itself is in motion. High precision location of objects and features are provided, with millimeter and sub-millimeter accuracy.

The workflow for operation and integration into the daily set of tasks involved in 3D image capture is streamlined and simplified, thus improving user productivity. The 3D image capture system is small, light-weight and extremely easy to use. A user can have a 3D model of a scene stored in memory and displayed on a local screen in a few seconds. Examples of typical workflows are shown in FIGS. 4A-4D.

Figure 1:
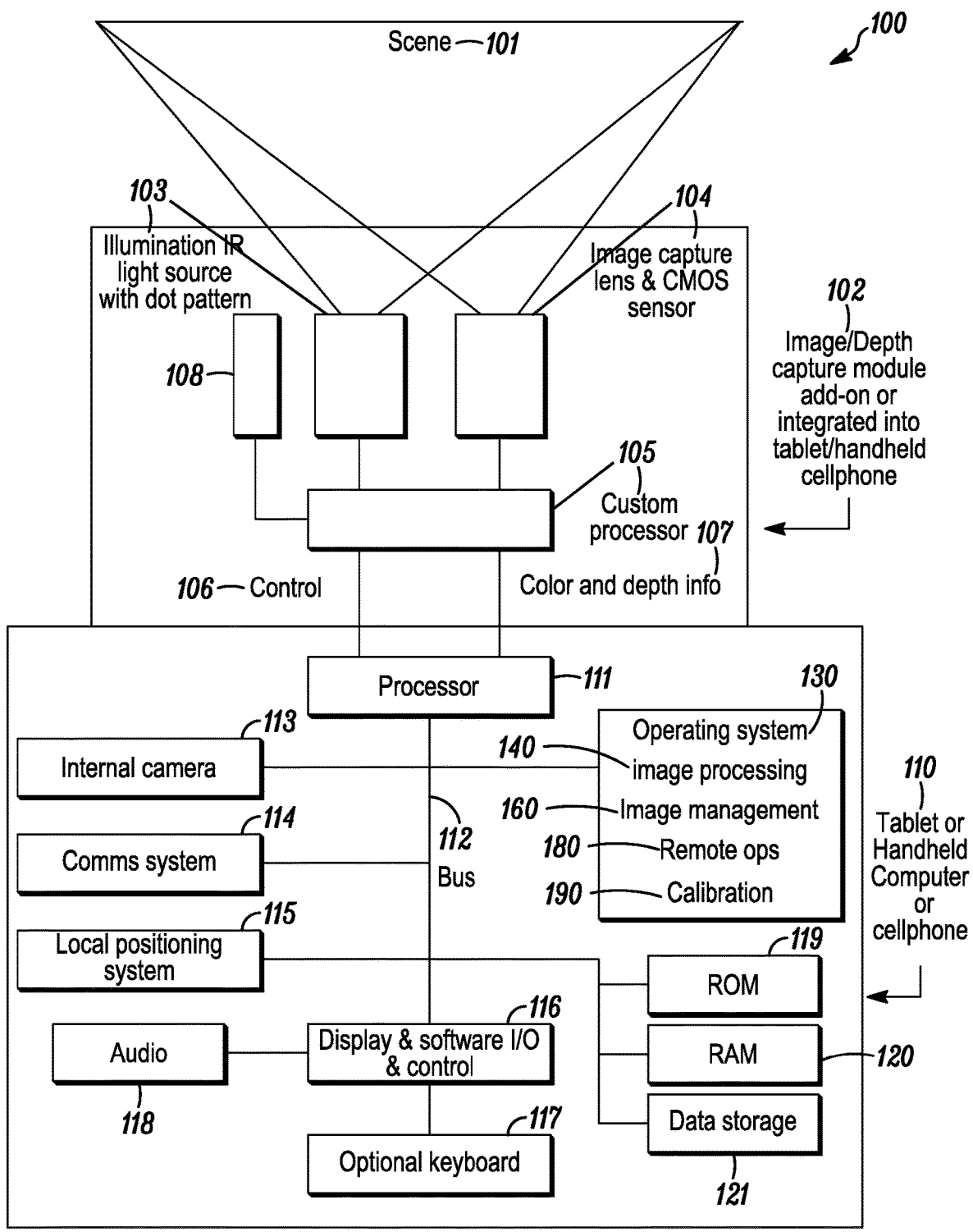
FIG. 1 depicts a system block diagram in an embodiment of the present disclosure.

The main components of the product are shown in FIG. 1, System Block diagram 100. The user desires to capture a scene of interest 101. The Image Capture and Depth Determiner 102 is used for capturing multiple images of a scene along with a depth map for each scene. A handheld tablet or smartphone 110 is used for implementing a 3D rendering system and operating the complete system. The tablet or smartphone is configured to enable a user to operate the image capture device, to obtain a data stream of images with depth map information for the image, which may include depth information for pre-determined spots in the image, and to perform any of a number of image manipulations based on additional software available to the tablet/smartphone computer. The handheld computer has programs for its internal operations and applications programs for managing the image capture and various processing tasks. Software for improved image processing 140 includes programs that can capture and deliver image and depth information, combine multiple images into a single 3D model for viewing, analyzing, and managing. Software for image and model manipulation and management in real time. 160 is another main embodiment of the disclosure. Additional software is available for performing many other functions on the captured and combined images, for a variety of purposes. The features and functions of each of these components are next described in detail.

Image Capture and Depth Map Determiner 102

In an embodiment, the 3D imager comprises a Red-Green-Blue-Depth (RBD-D) camera as the principal sensor, operated by and with a tablet computer or a smartphone. The camera is configured to operate with a Structured-Light depth map determination system. Alternatively, the camera may be configured to operate with a Time-of-Flight depth map generator. Sensors provide depth map data in real time using inexpensive components.

Structured Light depth map imaging systems are available from PrimeSense, an Israeli company which supplies components to the Microsoft Kinects system for detecting a user's body parts position and movements, as part of their product offerings. More information may be found at www.primesense.com. A specialized infrared light beam system 103 broadcasts a dot pattern toward a scene of interest, delivering a series of tiny dots that illuminate the objects in the scene. The number and spacing of the dots defines the resolution obtainable. An imager 104, similar to what is found in digital cameras, captures the scene and the illuminating dots in a special sensor, called the PS1080. Imager 104 includes an image capture lens and a CMOS sensor. The sensor derives a synchronized depth image, a color image, and optionally an audio data stream.

See FIGS. 2A-2B for additional details. FIG. 2A depicts a block diagram of the components of a PrimeSense image capture and depth map determiner 200. Components include a microprocessor 201, with an IR light transmitting capability 203 and a depth-determining CMOS functionality 205. If audio is desired, an audio section 208 may include one or more microphones 209 and one or more, possibly several, audio sources 211, for generating and detecting sound to accompany the image or images taken. The system may also include separate memory 213 or portable memory 215, such as the USB flash drive shown. The depth map is created in real time for each captured image. Module 102 may also include a custom processor 105, which may include a control portion 106 and storage 107 for color and depth information. FIG. 2B depicts a PrimeSense image capture and depth map determiner system 230. The system includes a light source 231 and light detector 233 to illuminate target of interest 235 and detect light reflected from the target 235. The system control 237 may include a microprocessor 239 with its own memory 241 and input/output systems 243.

Similarly, fully integrated sensors 108 for performing Time-of-Flight (TOF) distance measurements without any moving parts are available from the PMD Technologies Co. in Siegen, Germany. More information about these systems may be found at www.pmdtec.com. The sensor generates a modulated optical signal, and measures time of flight directly.

For example, the PMD PhotonICs 19k-S3 chipset obtains distance measurements to each pixel instantly, thus providing both a 3D representation of each pixel in view in the scene, as well as grey scale illumination data, simultaneously. Data from the chipset may be read out at rates of 15 MPixels/second. PMDTech also offers a complete camera system called the CamBoard, which is the first USB powered single board 3D TOF camera. Other companies with similar products include SoftKinetic and MESA Imaging.

The capture rate for these sensors permits image frame capture at rates up to 60 frames/second (fps). These sensors do not provide the same level of resolution that more complicated and more expensive scanners can provide. However, with the combining system employed in various embodiments of the disclosure, many of the limitations are overcome.

Multiple image capture devices may be used and their data streams delivered to the handheld/tablet or smartphone computer device. Image capture devices from alternate suppliers may be employed to deliver image data as well. For example, robots carrying imagers can be employed in hard-to-reach places such as tunnels or sewer systems.

Handheld Tablet/Smartphone for Implementing a 3D Rendering System and Operating the Complete System In an embodiment of the present disclosure, the tablet computer, handheld computer, or smartphone shown at 110 serves as the user interface for controlling the image sensor and depth capture sensor subsystem 102. The tablet computer may be any of the products offered on the market such as the iPad by Apple Computer, the Galaxy III by Samsung, and many others. Similarly, an embodiment of the present disclosure may be realized with a smartphone such as an iPhone, offered by Apple Computer, or the Galaxy family of smartphones offered by Samsung, or various Android phones offered by the HTC company of Taiwan or the Razr offer by Motorola. All of these products contain an operating system 130 configured to run and manage the tablet itself, and to implement a host of applications such as those in embodiments of the present disclosure.

The essential elements of a handheld computer are the ability to operate it while holding it in one or two hands, without any additional support; to be able to see the resultant two-dimensional (2D) image as captured by the image/depth capture module 102, on a display 116; and to be able to input control information and commands via either a touch screen (also at 116) or an optional keyboard at 117. An audio output 118 is also desirable, if not absolutely necessary. The processor 111 available in current tablet computers has suitably fast clock operations, greater than 1.0-1.4 GHz, to facilitate real time operation of the image/depth capture system and process the image and depth data, to provide a visible image in near-real to real time. Additional features and functions common in most if not all of such handheld computers available today and connected on bus 112 may include a second internal camera 113, a communications system 114 further comprising at least one of a cellular telephony link, a cellular data link, and a Wi-Fi link.

Software such as Operating System 130 contains applications for operating these accessory functions, along with data management and storage in ROM 119, RAM 120, and Data storage 121, which may comprise an external memory device like a USB memory stick, or any other suitable non-volatile storage medium. Besides the operating system, software may include image processing software suite 140, image and data management software suite 160, and a suite of software for imager calibration 190. As outlined below, each of these may include a variety of separate programs. In an embodiment of the present disclosure, audio capture via the custom processor 105 and audio playback via software in the operating system 130 enable capture and playback of sounds during image capture as well. This feature facilitates verbal note-taking while performing the image data capture if so desired. While the computer may be handheld, a local positioning system 115 or aiming system may also be used Software for Image Capture and Rendering to Form a 3D Data Set A number of software programs useful in the present disclosure are listed in FIG. 5. In an embodiment, image processing software 140 is provided for using a stream of RGB-D video frames to form the combined 3D data set. These include Program 141, Image Capture and Pre-processing, one of the group of applications 140, the Computer Vision and Scanning suite. For capturing and rendering, the suite includes a real-time RGB-D image visualization program, Program 142 shown in FIG. 5 as part of Image Processing suite 140. The software may be configured to operate on a portable handheld device like a tablet computer or a smartphone.

In an embodiment, new stitching or combining software is used to automatically merge two or more images together to form a composite 3D model. With this software tool, a model may be created from one or more images taken from different viewpoints in the scene. The result forms the basis for creating a panoramic image. This process is done in real-time, on-the-fly, so that the user can, at any time, view the formed 3D model, even during capturing, from a variety of viewpoints. This includes the current viewpoint of the attached camera, resulting in an Augmented-Reality-style visualization. The instant 3D model formation enables a user to see exactly where additional data points might be taken, and enables the user to point the camera to the desired region in need of more detail. In other words, holes in the image of the scene can be fixed on the fly. Additionally, the quality of the data in the scene can be assessed, and additional images from different viewpoints can be obtained as needed.

Elements of the software include suggestions for user-initiated actions to complete a portion of a scanned image, including directions to aim the image capture device. Because of the power of the combining algorithms used, including the capability of 3-D reconstruction, images obtained from other instruments with differing levels of detail may also be inputted into the tablet or smartphone computer system. The advantage of fast combining or modeling means that field adjustments and retakes can be done in near real-time with these other instruments as well as with the instant system. Image capture devices which also produce 3D depth maps along with greyscale or color images, such as those built by Trimble Navigation Limited, FARO, Z+F, and so forth may be inputted to this system.

The software provides an integrity metric to indicate when there is not enough data to perform a decent combining or 3-D modeling operation or to obtain registration of particular image with a previously declared registration point in the image. The declared registration point may be obtained from an arbitrary model, either from a Computer-Aided Design (CAD) model or a 3D point cloud model. The user interface is changed in a way that the user sees or is notified where there is not enough data captured in the scene as the scene is being combined or modeled.

In an embodiment, in Program 143 for example, the software is configured for real-time alignment of 3D derived data with an RGB image, thus putting a high-resolution photo image into spatial context with the 3D derived spatial data. In another embodiment, the software in Program 144 is configured to enable a user to compare the collected or imaged data to the RGB frame, showing the difference in a way or method that shows the user, on the User Interface (UI} where data does not match the RGB position. This may be due to an inability of the ranging system to extract the distance for each illumination dot in the image frame, based on the color, reflection or other environmental condition of the scene. This may be due to a variety of causes, such as lack of surface illumination, too much illumination, ripping or tearing of the surface edge, or a need for more image data. This may be done in real time with the results displayed and made available, for example, in an augmented reality (AR) situation. Program 145 includes additional capabilities for processing and registering images in post-processing operations, with capabilities for real-time results and displays with AR applications.

Software for Image Manipulation and Management in Real Time

A suite of software programs 160 are available to the user for performing a number of different operations on the captured and/or processed images with the associated 3D information. In one embodiment, a 3D Modeler software algorithm, Program 161 processes a real-time RGB-D, a range or depth map data stream on the handheld computer system, to create a 3D model of the recorded scene, as the user captures the data. The frames or a group of frames are used to reconstruct the scene as the device is moving through the scene. In contrast to the disclosure described in points 27 to 29, this point describes a formed 3d model with basic geometric primitives (polygons, planes, cylinders, boxes, etc. as used in common CAD systems) as opposed to having individual 3d points. In constructing the 3D-primitive model, not all points may be used from each frame, but the best points are selected, which may include all the points in the image as a reference for the stitching or registration from frame to frame or used when geo-referencing in other data as a registration anchor. The 3D Modeler program also may add its data to the RGB image data in a seamless combination. The 3D Modeler program may add its data to a pointcloud 3D model, or to a panoramic stitched image, or to both.

In program 162 (suite 160) an existing 3D CAD model or 3D point cloud model is obtained and displayed in a manner relating to the current scene capture. For example a virtual model can be registered with the just-captured, processed, and fused 3D model. For visualization a virtual camera is used that can take on any desired viewpoint. If the current viewpoint of the camera during capturing is used for visualization, the visualization mode is generally referred to as Augmented Reality (AR). The existing model may be downloaded via the communication link from a remote library or storage facility, as may be found in Cloud storage. In another embodiment, new data may be captured and added to an existing model. The user can select one or more points, or groups of points by selecting from the data of the scene as shown on the User Interface; alternatively, the user may select a pre-determined set of range data. The user can define known values in the data, example, a sphere or target of some known type that has either a current geo-referenced position or a point, group of points, or a derived location from a set of points into a known transform.

In another embodiment, software algorithms are provided to enable a user to extract known shapes or a particular geometry, such as Program 163 in suite 160, from a captured image of a scene, and to export a definition that allows the shape to be reconstructed on another remote device, like a desktop computer, or another smartphone or tablet. Alternatively, the extracted and modeled shape can be stored in a remote storage facility, and used in another program that places the object in a specified geo-referenced model of the current scene.

In another embodiment of an available software algorithm, Program 164 in suite 160, a user may operate a program that is configured to determine and visually display differences between the scanned captured model and a pre-existing model. This is particularly useful for comparing the as-built condition of a structure or object with the desired design specification.

In an embodiment of an available software algorithm, program 165, a user may operate a program configured to perform a transform of captured data for a particular scene to an externally provided model of a desired design for such a scene. With this program, the newly captured scene data may be matched to the design coordinate reference frame.

In another embodiment of an available software algorithm, a user may operate a program configured to perform real-time data streaming via a communications link, Program 166, to a remote storage facility, or to a remote computer for display and manipulation by another person. This operation enables joint sharing of instant image data, for improved workflow involving making changes, taking new image capture operations, and sharing observations about the results. The communications link may be configured to include voice communications as well as the image data communications. This type of communications-based image/operational information sharing enables a central manager to supervise and review one or more remote data collection operations in real time or near-real-time. Additional features include the ability to direct data transfers from and to other image capture devices as may be associated with a given handheld computer system.

In another embodiment of an available program, Program 167, one or more basic RGB-D images may be transmitted directly without performing an integration of the RGB-D frames into a 3D model in the capturing computer. Instead the model creation may be carried out remotely at a Cloud-based server and made available to other interested parties via cloud access. This transmission and conversion process may be done in real time as the data is collected. Alternatively it may be done in a post-processed operation, and any or all of the data may be extracted from a storage facility, locally on the tablet, or stored in a remote storage facility such as a cloud-based service, and manipulated in a remote location by another interested party.

In addition, in an embodiment, one or more basic RGB-D frames may be compressed and streamed to a remote location for storage and further processing, as described above. In another embodiment, the program is configured to enable the user to select individual frames for transmission to the remote facility for storage or viewing and manipulation. In yet another embodiment, a program 168 is available for providing a registration geo-reference point to incorporate and match to a selected location point in a captured image.

In another embodiment, an available program 169 is configured to extend and fill in an existing 3D model with newly recorded 3D data. The new data is manipulated by the software algorithm so that it blends seamlessly with the pre-existing data. In another embodiment, a program 170 is available to extract surface angles from captured RGB-D imagery in real-time and to provide immediate visualization of the surface angles. The program is further configured to create an augmented-reality (AR) form for the display of the angles.

The Handheld Portable Computer: Tablet, Smartphone, or Notebook

The handheld computer as described above may comprise a tablet computer of the kind available from Apple Computer, ASUS, Samsung, Blackberry, Microsoft, and the like. The handheld computer may comprise a Smartphone of the type offered by Apple Computer, Samsung, Nokia, HTC, Blackberry, and the like. The handheld computer may comprise a Notebook type of portable computer with a suitable form factor for handheld operation and manipulation, such as provided by ASUS, Sharp, HP, Dell, and the like. The handheld computer may be configured to record and display data from one or more image capture devices, sequentially or simultaneously.

A display software program 171 is available to provide one or more graphical user interfaces for operating the various programs cited previously. Graphical user interfaces (GUIs) may be embedded in each of the operating programs. Housekeeping functions such as changing a view point for a model, trimming or extending the data, converting between formats, seeking and displaying additional information, running simulations, are included. Program 172 is configured to provide and manage on-screen images for Post-Capture visualization.

Program suite 190 is configured to provide a calibration suite of programs for calibrating the imager. It contains Program 191 for calibration of projective images, and Program 192 for calibration of depth for structured light systems.

Flow Charts

Figure 3:
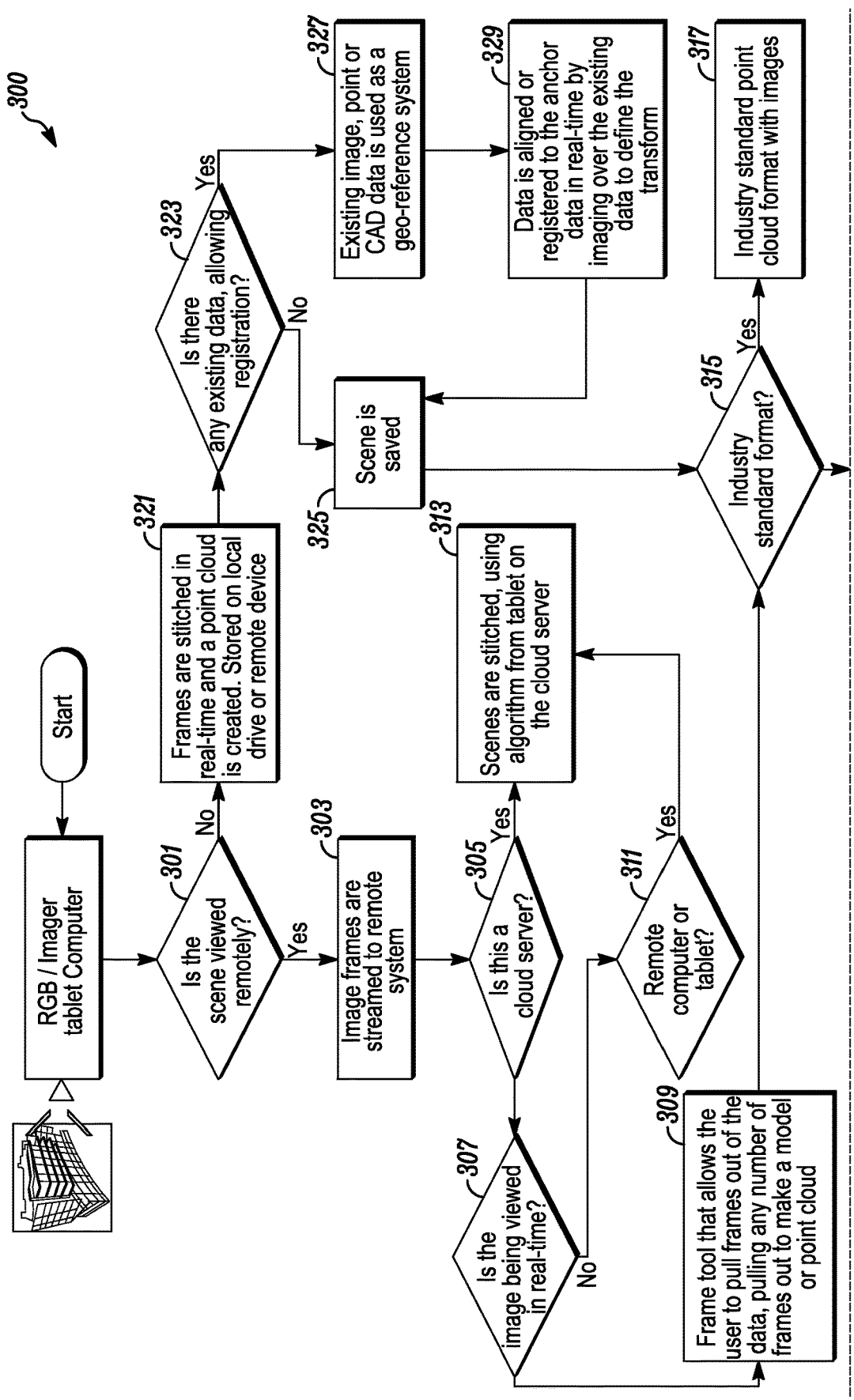
FIG. 3 depicts a flowchart for operational use of the present disclosure.
Figure 3:
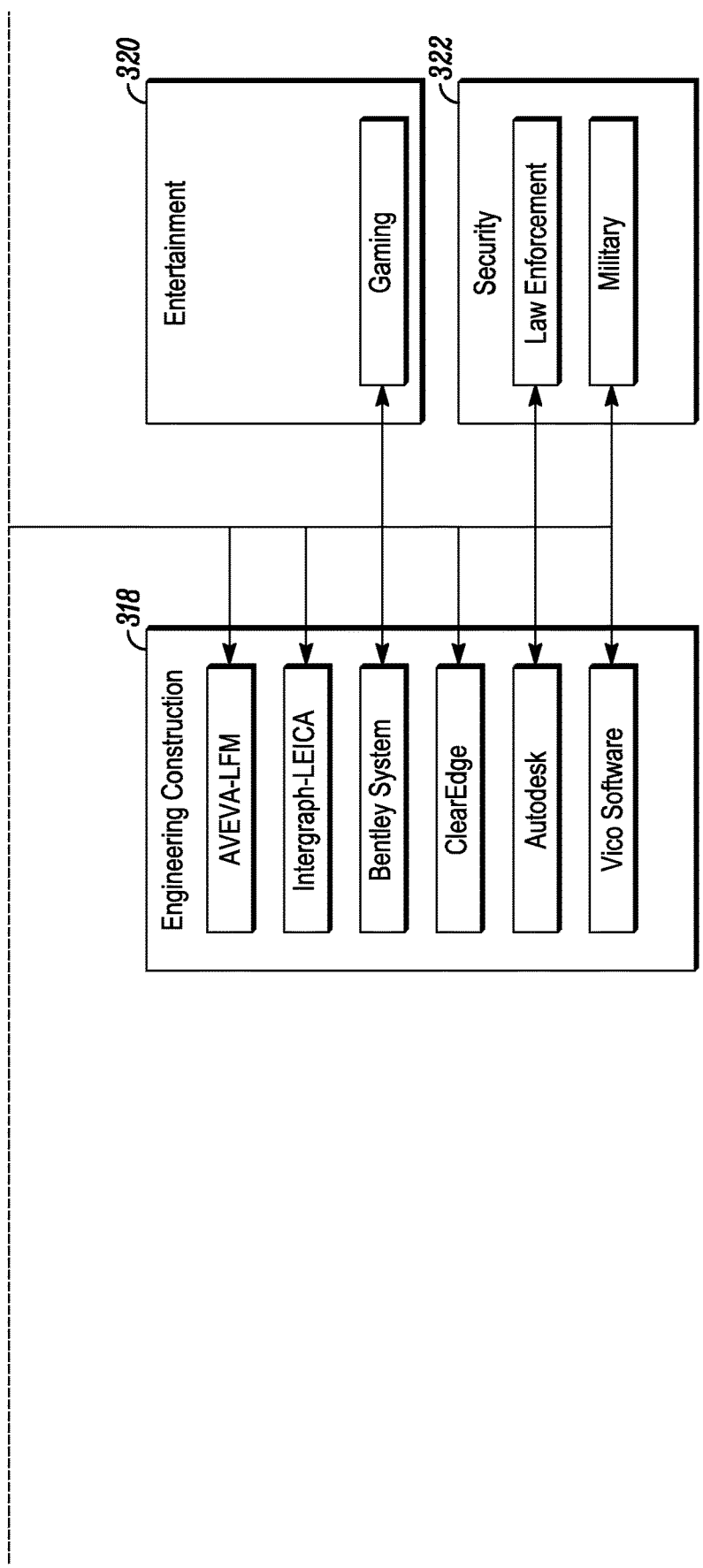

FIG. 3 depicts a flow chart 300 demonstrating a workflow for multiple operations of the imager/computer system, in a typical field operation. The real-time capture and manipulation made possible by the combination of fast hardware and fast software make all the steps recited in FIG. 3 possible. The start of the work flow begins, in this example, with an RGB/Image capable tablet computer, or other suitable digital imager. If the scene of interest is viewed 301 remotely, the image frame(s) are streamed 303 to a remote system. If the remote is a cloud server 305, the scene or scenes are combined 313, using an algorithm from a remote tablet or computer on the cloud server. If the image is not being viewed 311 in real time, e.g., the user is working with stored data, still with a remote system 311, the scenes or images are combined 313, as noted, using the algorithm from a tablet or other suitable computer on the cloud server. The images may then be used as is or subjected to further post-processing. If the image is being viewed in real time 307, a frame tool is used that allows the user to pull frames out of the data, pulling out the desired number of frames to make a model or point cloud 309 for the desired image or images. The images preferably conform to industry standard formats 315. If the images do conform, the data may be saved using 317 industry-standard point-cloud formats for the images. As noted in FIG. 3, these may include a number of engineering/construction formats 318, entertainment formats 320, such as gaming formats, or security formats 322, such as those for law enforcement or the military.

If the user, on the other hand, is present at the scene, then frames or images are combined in real time 321 and 3-D model is created and stored locally or on a remote drive. If additional processing is desired, such as for creating composite images or for manipulating the images, a check may be made 323 as to whether data exists, e.g., position or location data, that would allow registration of the image or images, such as to allow stitching. If not, the scene or image is saved as is 325. If data exists that would allow registration, then one or more existing images, scenes, points or CAD data is used as a geo-reference system 327. The data is then aligned or registered to the base or anchor data in real time by imaging over the existing data to define a transform 329, and the data is then saved 325. Reference systems include but are not limited to: GPS, WGS-84 and NAD83. Reference systems may also include local northing and easting, such as from a county reference system, and may also include any convenient datum, such as a local on-site reference spot, like the cornerstone of a new building, the pupils of a person's eyes, and the like.

Figure 4A:
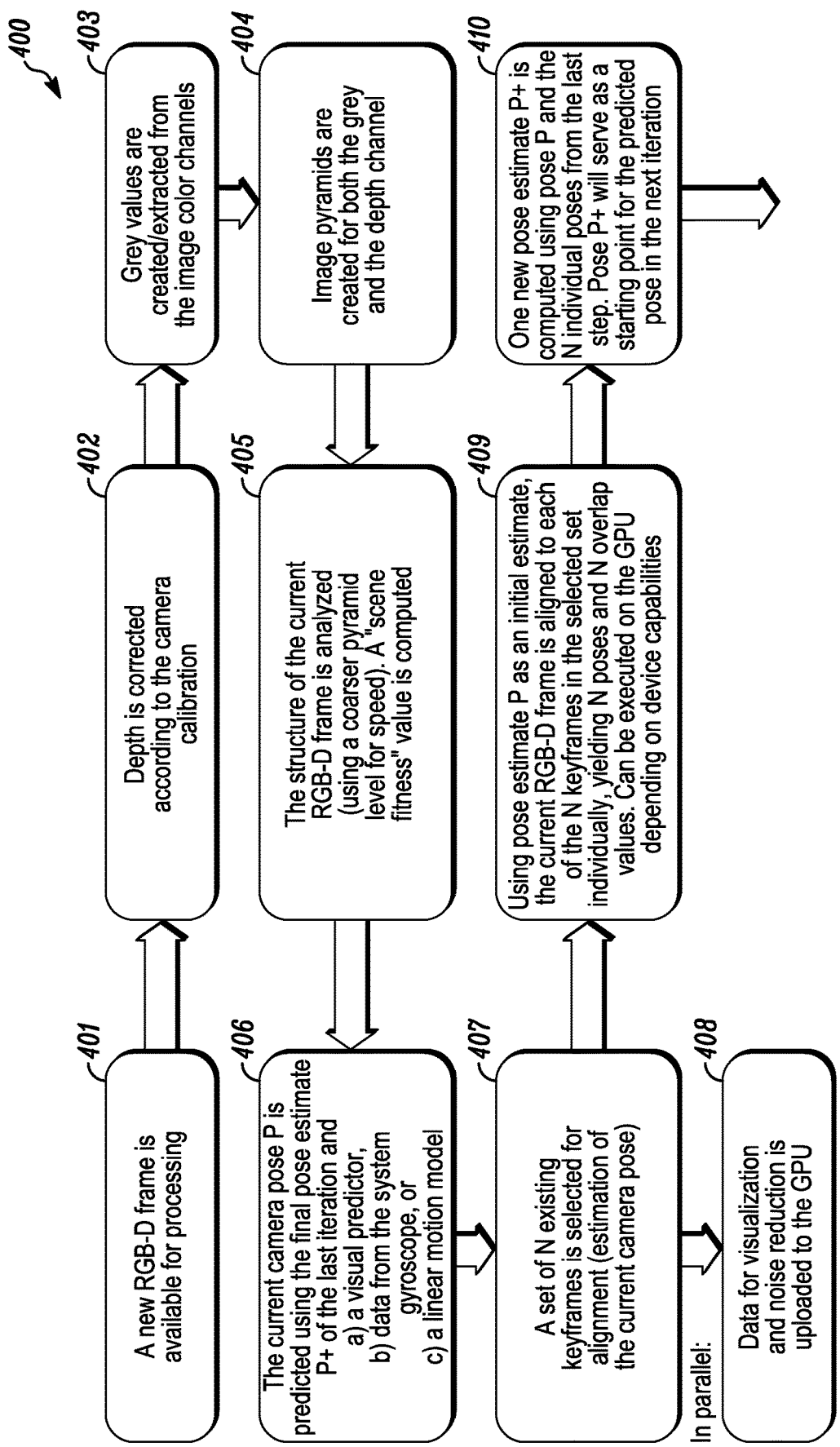
FIGS. 4A-4D depict a series of flowcharts for the internal steps performed by the image capture operating system in deriving a three-dimensional representation of a scene.
Figure 4B:
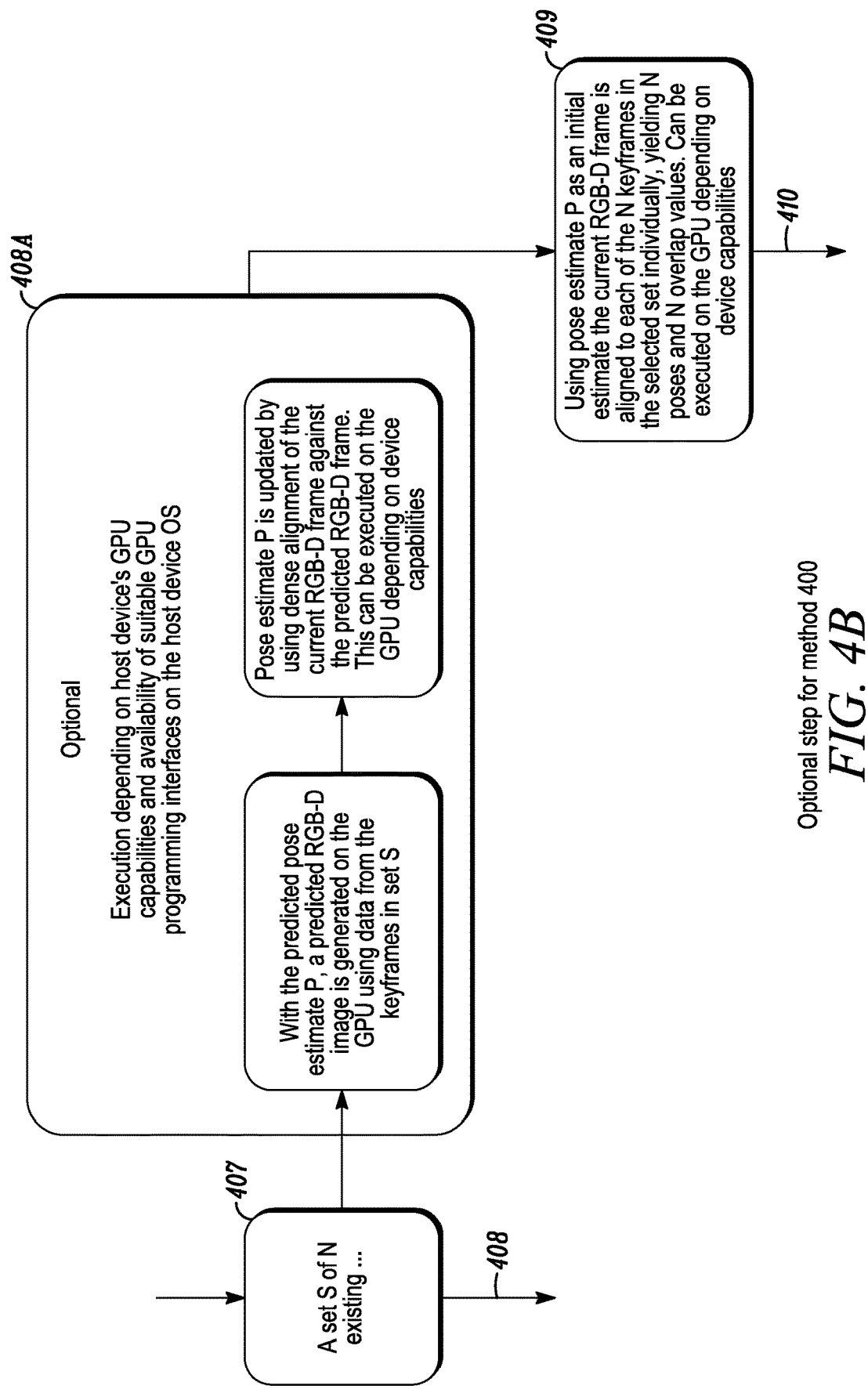
Figure 4C:
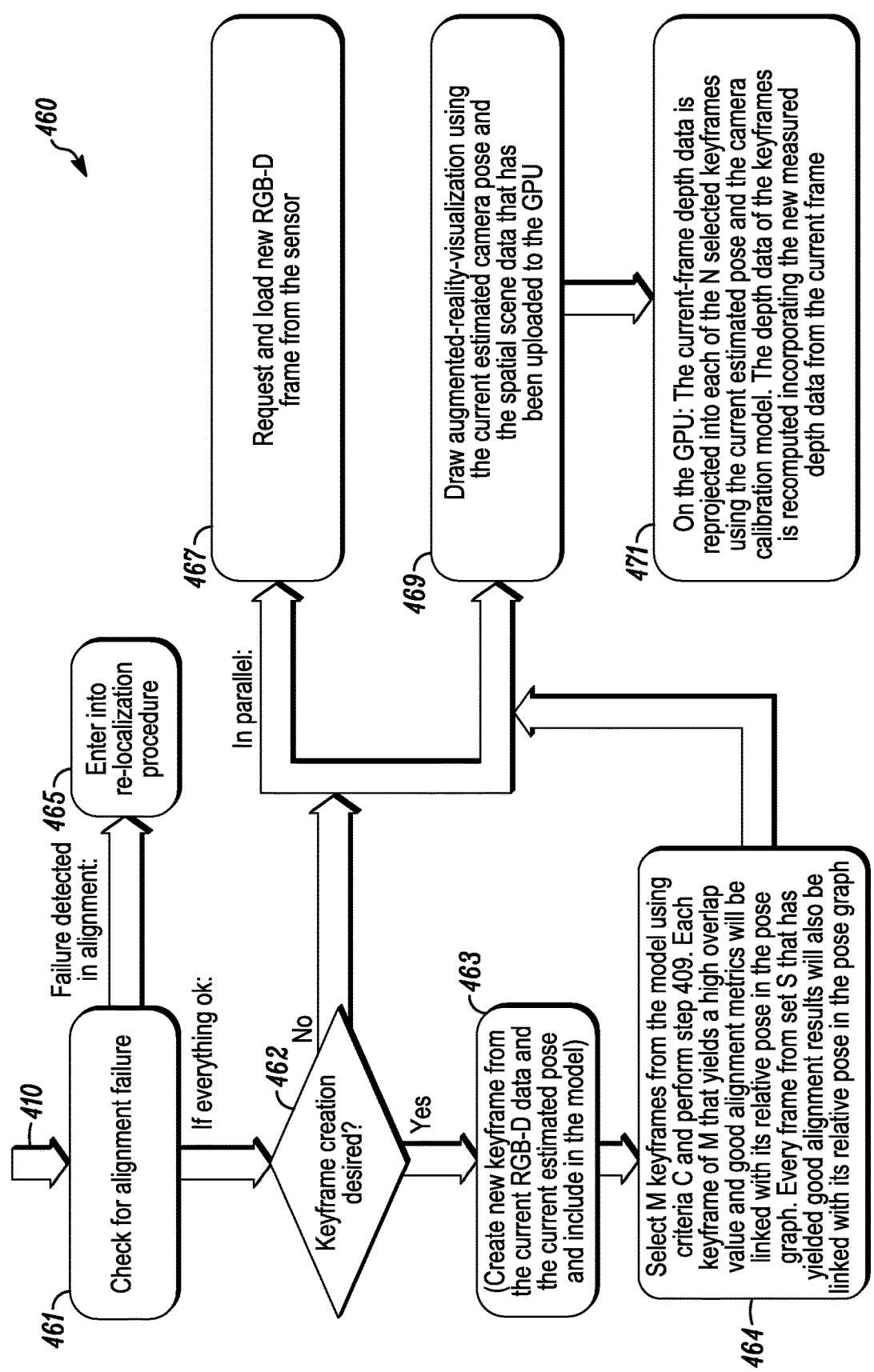

Additional flowcharts for image processing are also detailed in FIGS. 4A-4C. In FIG. 4A, steps are disclosed for internal operations for image capture and processing. The process 400 for FIG. 4A includes a first step 401 in which a new RGB-D frame has been taken and is available for processing. The depth channel may be corrected 402 according to the camera calibration. Grey values are created or extracted 403 from the image color channels and image pyramids are created 404 for both the grey channel and the depth channel. In the next step, the structure of the current RGB-D frame is analyzed 405, using a coarser pyramid value if speed is desired. A scene fitness value is computed that corresponds to the condition number of the covariance matrix computed by aligning the frame against itself under 6-dof pose movement.

The fitness value describes the system's ability to perform real-time frame alignment using the given RGB-D frame. The current camera pose is predicted 406 using the final estimated pose from the last iteration. Also used in predicting the current camera pose is a visual predictor, data from a system gyroscope or a linear motion model. A pose is a camera position and orientation in space, typically described by a 3-vector for its translation and a 3×3 orthonormal matrix for its rotation. Then, a set S of N existing keyframes is selected 407 for alignment with the estimation of the current camera pose. S is determined by a breadth-first search in the keyframe graph starting with the current active keyframe. The next steps are taken in parallel, with data for visualization and noise reduction (including RGB-D for the current frame) uploaded 408 to the graphics processor unit (GPU). At the same time, the current RGB-D frame is aligned 409 to each of the keyframes in the selected set S, using the predicted pose P as a starting point. The alignment step minimizes geometrical and photometrical alignment error between a frame pair over 6-dof pose variation following the motion of points under lie algebra se(3). The result of this step is the desired number (N) of pose updates, one for each keyframe in the set, and the same number, N, of overlap values between the current RGB-D frame and the particular keyframe.

Depending on host device capabilities two optional intermediate steps may be performed before step 409 to improve the quality of the camera pose estimate and reduce pose-drift throughout the entire capture. As shown in FIG. 4B, step 408A, a predicted RGB-D frame F is rendered on the GPU, using RGB-D data of the keyframes in S and the pose of the current active keyframe and the relative keyframe poses in S with respect to the active keyframe. The pose estimate P is then updated or improved using dense alignment of the current RGB-D frame against F. The execution of the steps of 408A depends on the availability of suitable computer languages for the host device GPU. The process then continues to step 409, as discussed above, and then to step 410. From the best available camera pose estimate P and a set of N computed individual per-keyframe relative poses, a new camera pose estimate P+ is computed using a weighted average of all the input poses.

A third flowchart 460 for another part of the method for image capture and image processing is depicted in FIG. 4C. After P+ is computed, alignment metrics are analyzed 461, including a normalized geometrical RMS alignment error, the number of occluded points and the overlap value. Alignment metrics from all the previous alignment steps are analyzed and a re-localization procedure is entered 465 if the analysis suggests an alignment failure. In that case, none of the following steps are performed.

If the alignment is good the keyframe in S with the highest amount of overlap with respect to the current frame becomes the new active keyframe. If certain conditions or criteria are met 462, a new keyframe is created 463 as desired from the current RGB-D data and the current estimated pose, and is included in the model and becomes the active keyframe. The criteria are based on the computed N overlap values, the current camera pose and the poses of the N keyframes. If the criteria not met, the process goes directly to steps 467, 469 in parallel, as discussed below. The criteria may include a number of requirements. One useful criteria includes a predicted overlap of a first frame A and second frame B. A high amount of matching visual or geometrical features, or both, are extracted from frame A and frame B. The matches should be consistent with a relative pose between A and B.

If the criteria are met, a new keyframe is created 463 a set T of M keyframes is selected from the model based on criteria of step 462. Step 409 is performed on T and each keyframe in T that yields a high overlap value will be linked 464 to the new keyframe with its relative pose in the keyframe graph. Every keyframe of set S that has yielded good alignment results will be additionally linked to the new keyframe in the keyframe-graph Next, two steps should take place in parallel. A new RGB-D frame is requested and loaded 467 from the sensor for the next frame. In addition, an augmented-reality visualization is drawn 469 using the current estimated camera pose and the spatial scene data that has been uploaded to the GPU. Subsequently, on the GPU, the current frame depth data is reprojected 471 into teach of the N selected keyframes, using the current estimated pose and the camera calibration model. The depth data of the keyframes is recomputed incorporating the new measured depth data from the current frame.

Figure 4D:
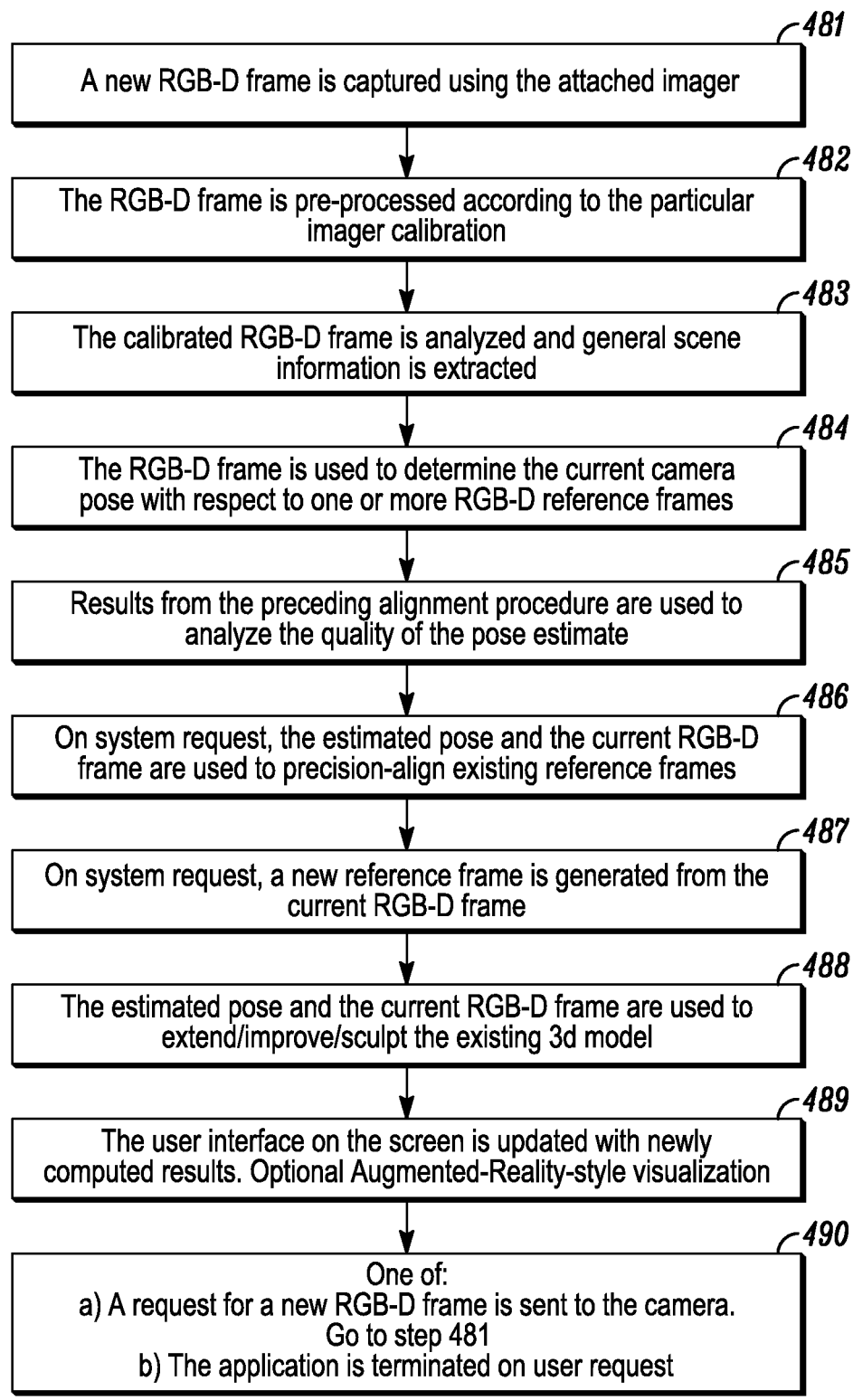

A fourth flowchart is depicted in FIG. 4D. This is an abbreviated process for steps for image capture and image processing. A first step is to capture 481 a new RGB-D frame using the imager. The captured RGB-D frame is pre-processed 482 according to the particular imager calibration. The calibrated RGB-D frame is then analyzed 483 and general scene information is extracted. The frame is then used to determine 484 the current camera pose or orientation with respect to one or more RGB-D reference frames, that is, to align the frame. The results of the alignment are then used to analyze 485 the quality of the pose estimate. On system request, the estimated pose and the current RGB-D frame are then used to precision align 486 existing reference frames, and a new reference frame is then generated 487 from the current RGB-D frame. The estimated pose and the current RGB-D frame are then used to extend, improve and/or sculpt 488 the existing 3D model. The user interface on the screen is then updated 488 with the newly computed results. The results may be used for optional augmented reality style visualization with suitable equipment. In addition, the process may be repeated 490 as often as desired for better alignment.

Closeup Utility for Human Physiognomy

In an embodiment, the integrated 3D imager can be used to capture and provide measurements of human or animal physiognomy. Measurements for eyeglasses and contacts can easily be obtained with millimeter accuracy. Detailed maps of the head, the cornea, eyes, ears, and the like may be captured in a few seconds. Similarly, 3D imagery of other body parts may be obtained, for use in making prosthetics, or for use by plastic surgeons in creating models for making adjustments to one's physiognomy or for providing surgical repair for accidents or other damages.

As an example of a typical operation, one may first measure the eyes and nose of a person. From that information, the separation between eyes, the interpupillary distance, can be found. The shape and size of the nose can be found. The location and size of the ears relative to the location of the eyes and nose can be found, including the distances, so a pair of eyeglass temples can be specified. Models of eyeglass frames may be selected by a buyer from a catalog. Digitally stored 3D models of the frames can be overlaid in the image to check for fit and to see if they suit the buyer. Such a service could be an aid to selling eye care products. In another embodiment, the image of the person's face can be inverted so that the person sees what he would see in a mirror.

Scene Compression, Efficient Scene Storage/Compression in Binary Data Format

A classic problem with 3D point cloud data is large resulting file sizes when stored in an uncompressed manner. Efficiently compressing point clouds however is only possible when there is structure in the data that can be used to extract and (and compress) redundancy in the data.

Figure 6:
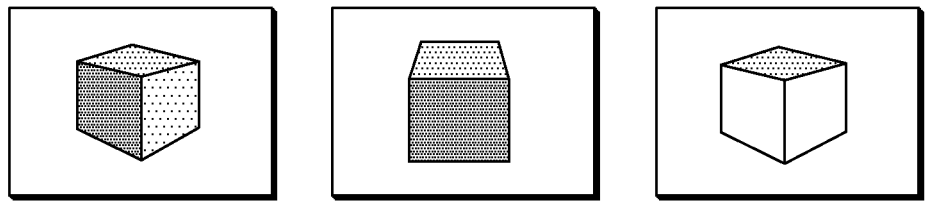
FIG. 6 illustrates color/depth maps as seen from keyframes useful in representing 3-D scenes using 2-D image maps.
Figure 7:
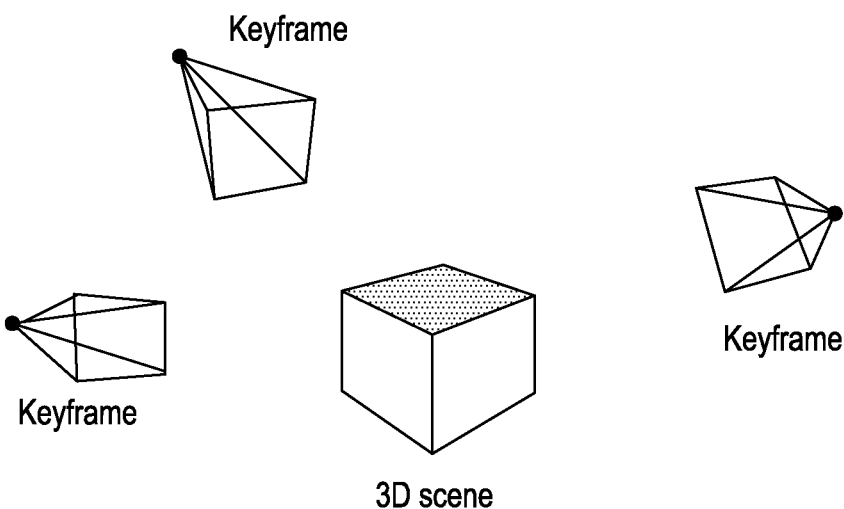
FIG. 7 illustrates keyframe representations taken from different points of view in a scene.

Since the software in the main invention uses "Keyframes" to represent the 3D scene and to model the necessary structure for compression, it is given in the form of 2D image maps. Keyframes are regular 2-dimensional RGB color images taken from different viewpoints in the scene. Every keyframe also has a depth map attached to it that carries depth information for each pixel. Depth is defined as distance of a point to the camera center along the camera optical axis. Depth maps and color images are registered so that for each pixel in the color image its depth can be looked up at the corresponding pixel in the depth image. In addition each keyframe carries the camera "pose" (extrinsic) information that encodes the camera position and viewing angles in a matrix and the camera internal (intrinsic) parameters (optical center, field of view, radial distortions). The 3D position of a pixel in a keyframe can be recovered by taking into account the depth of the pixel and the camera extrinsic and intrinsic parameters. See FIGS. 6 and 7.

Figure 8:
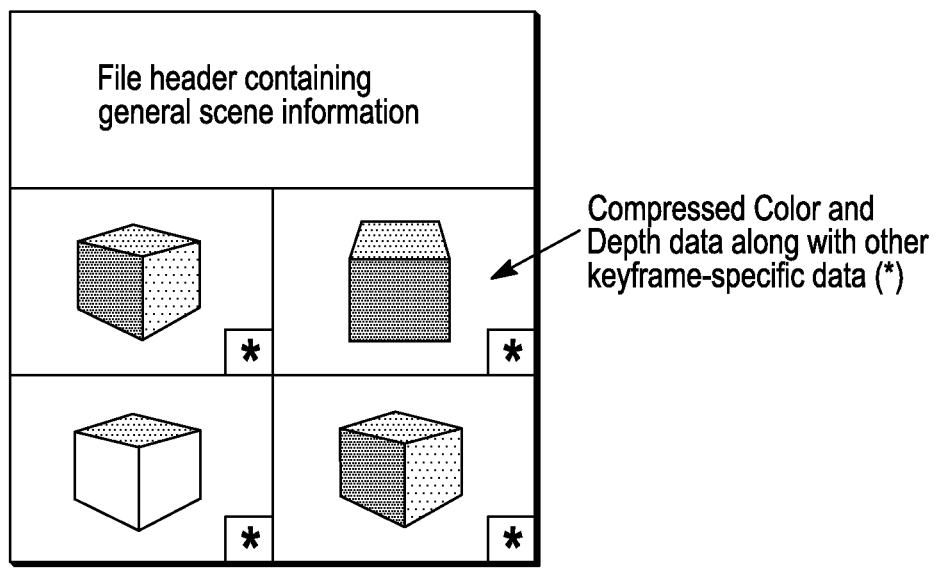
FIG. 8 illustrates a file structure format in which the file header contains general scene information.

Since the scene information is represented by a set of 2-dimensional image/depth maps, it is suited for compression by traditional image encoding techniques like JPG or PNG. For encoding the depth maps a lossless format (like PNG) should be chosen to avoid geometric error in the recovered model. Following that approach, a scene can be stored as a file comprising a general "header" section. The header may include among other things, meta-information about the scene, the data capture process and the global coordinate transformation. This may be followed by sections for each keyframe, each keyframe section storing, among other things, the keyframe camera extrinsic and intrinsic parameters and their color image and depth maps, encoded in an appropriate format. See FIG. 8 for examples.

In addition to RGB- and depth-maps several other images may optionally be stored for each keyframe, including masks and confidence maps.

Semi-Automated Transform Determination Using Artificial Targets

When a scene or object is scanned in 3D the acquired data lives in a local coordinate system as determined by the used sensor until it is determined where the data is located in a "global" coordinate system (which could be a true global coordinate system in terms of latitude/longitude/height or any project-specific local coordinate system). This coordinate transformation from local to global can be described by a euclidean- or similarity-transform in 3 dimensions and determining the exact parameters of that transform (thus putting the data into its global context) is essential for many real-world applications (such as BIM or Augmented Reality).

One method of finding the right transformation is establishing correspondences between world points and local points and then solving for the transformation that aligns these points. Methods for establishing correspondence are usually based on natural geometric features (corners, edges, planes, etc.), photometric features (surface texture or salient points) or artificial features such as specific physical target points in the scene for which the real-world location is known. Obtaining the transformation from the correspondences is usually formulated as a linear or gradient-based minimization problem and a solution is found using robustified linear solvers.

In order to obtain the desired coordinate transform the disclosed invention makes use of artificial features (in the form of physical scene targets for which the global position is known) for correspondence creation. The artificial features currently in use are "checkerboard" targets which are four black and white squares (2 black and 2 white) laid out in a checkerboard fashion and printed on a carrier material (such as paper). Correspondences are created by first designating potential checkerboard features in the scene model and then identifying each potential checkerboard feature with a corresponding point in the global reference set (or discarding the detected candidate feature if it is not a physical target or not contained in the reference set). The method currently in use for identifying checkerboard targets in the scene consists of a cascade of checks, each check removing candidates from the set of potential checkerboard features for a given sensor input. The cascade starts with all points in the current sensor input being potential checkerboard features. The first check mechanism in the cascade is based on the "Chess Corner Detector" (published here: http://goo.gl/mY10U). The second mechanism removes non-maximal points from the resulting set (in terms of "Chess score"). The third mechanism fits a 2D checkerboard image to the candidate point using ESM (http://ijr.sagepub.com/content/26/7/661.short) and an affine transformation model and the resulting error from a binarized fit and the translational drift is used to reject candidates. The fourth stage fits two straight lines to the rectified fit (starting with one horizontal and one vertical line) and rejects based on photometric error and geometric fit deviation (from horizontal and vertical).

Using the set of detected potential target features the identification of features with points in the reference database happens through user input. The user will thereby select a sub-selection of the current scene (which is presented to him on the device screen) and tap on a target feature. The system will look for the closest detected target candidate in the set of candidates and "snap in" the user selection to the closest such candidate. For the selected candidate the user then selects a corresponding target point from the reference list of actual targets. At least three such associations are necessary to start an automated fitting process that obtains the desired transformation using the correspondences. In the fitting process the system automatically associates other target candidates with reference features based on proximity using the current best estimate of the transform data. Likewise it rejects false candidates and matches based on the same metric. The transform fitting process uses a robustified linearized estimator that outputs 6 parameters of an updating transformation to a euclidean transformation. The initial estimate of the euclidean transform is given by aligning the centroids of the associated detected and reference sets and then solving directly for the remaining rotation.

Instead of simple checkerboard targets the system may use QR codes or so-called April-tags in future releases. Using QR codes or April-tags comes with the advantage of being able to associate meta-data with each target which can be used to store project data at a particular spatial location.
Target-Assisted Global Map-Optimization and Loop-Closure User-identified or automatically identified targets can assist the system in performing statistical global 3D-model optimization. The identification of targets across keyframes in the model yields a hard constraint for the global optimization procedure in the sense that two scene points (as marked by a target in separate keyframes) must be the same point in global 3D space. These constraints can help enable more robust global optimization in the case of heavily misplaced input data (such as when very large loops and/or distortions are present in the input data) and improve model quality after global optimization.

Instead of physical targets the user may also designate and identify scene points "by hand" by means of an appropriate visual user interface that allows for the precise selection of points. The user may additionally specify the desired usage of the designated scene points (for assisting loop-closure, for improving model quality, etc.) as some points may only be appropriate for some but not all usages.
Scan-Appending Capabilities The system disclosed herein is capable of appending data to a previously scanned area using automated localization. The user can load an existing scan into memory and select an area that he wants to start appending to. The system then goes into "localization" mode in which it attempts to identify the current sensor input (the user pointing the device to the desired area) with the selected area in the existing scan. The identification process is based on the regular keyframe alignment process as disclosed above with the difference of using a coarser-scale resolution as the bottom level in the "coarse-to-fine" alignment scheme in order to aid convergence from misaligned viewpoints. Once a suitable alignment between the current camera RGB-D frame and the desired keyframe is found (based on an error metric consisting of geometric error and general scene geometric attributes), the system will switch back to regular scan operation and append to the scene/model as in regular scan operation.

The described append functionality is capable of appending to a variety of existing 3D input data including but not limited to a) existing 3D data captured with the disclosed device, b) 3D data captured by a laser scanner, c) 3D data as created by 3D-modeling or CAD software.
Target Detection and Identification The user identifies targets after capture by tapping/clicking on an imaged target displayed in a keyframe's RGB data on the host device screen and entering the target ID. The system can automatically try to identify and position April-tags or other QR-code or bar-code-like targets in the RGB-D stream available to the device upon user command. The user command is usually a simple button press upon which the system tries the described identification. Detected targets, codes, tags etc. are visualized to the user during scene capture by projecting their 3D position into 2D screen coordinates (using the sensor pose and its camera intrinsic parameters) and highlighting the area around the projected target point(s). The system can also try to identify and position April-tags or other QR-code or bar-code-like targets after capture in the 3D model by doing detection, identification and positioning on the individual keyframes instead of the current RGB-D frame. Detected/Identified targets are visualized either as highlighted areas in the rendering of the 3D point cloud or as highlighted areas in the keyframe images.

Auto-Targeting on a Tablet or Mobile Device

The system disclosed herein includes an ability in real or near real time to stitch spatial data based on an existing survey control network, as data is being collected or used as real-time validation and Geo-referencing. This includes the use of known survey targets or control in a scene, allowing the device to auto-locate or geo-reference to a reference coordinate system. The use of known survey targets or control system, and a method of displaying the fit of the network as the data is geo-referenced into the network. A plane or control point is placed on the first target, allowing the user to accept or decline the point, as the second point is captured, the target or control location is updated, locating the captured data into the correct geo-referenced network. Once the third control point is located, the data is fit to the known points, and a value of the fit is applied to the scene, allowing the user to accept by continuing to fit more control points to the solution until he data meets the project requirements, by adding additional control points or removing points.

The disclosed system includes the ability to use targets or control points without identification of labels or attributes, by using only the position of the target and the spatial offset between targets, and their angle to match existing points to imaged targets present in real-time RGB-D stream available to the tablet or mobile device. This includes the ability to search an image or spatial dataset for a group of points, based on shapes represented by CAD objects, allowing the spatial data to be transformed into a geo-referenced coordinate plane as the data is collected. The system thus has the ability to load an existing scan or image into a tablet or mobile device, and to append to the original dataset or a group of data sets, and append new data and transform the newly collected data to the original dataset, while not using targets or control. The system thus has the ability to fit CAD shapes on a tablet or mobile device, using a ranging sensor and a camera to fit new CAD shapes to the existing data.

Real-Time in-the-Field Differencing

The disclosed system is capable of performing functionality based on the differencing of existing 3D data versus existing conditions. The differencing ability makes use of the system real-time append, (re-)localization and 3D alignment abilities to achieve registration between existing 3D data and 3D (or RGB-D) data captured by the device.

General Principles

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law. While the disclosure has been described in connection with certain preferred embodiments, other embodiments would be understood by one of ordinary skill in the art and are encompassed herein.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic coprocessor, communication co-processor and the like) and the like that may directly or indirectly facilitate execution of program code or program instructions stored thereon. In addition, the processor may enable execution of multiple programs, threads, and codes.

If more than one processing core is available, the threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs, non-transitory data, as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die). The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a non-transitory storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another. The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law. All documents referenced herein are hereby incorporated by reference.

What is claimed is:

1. A method for creating or extending a pose graph of keyframes from a moving camera, wherein each keyframe comprises a 2D digital image with corresponding depth data and a corresponding pose, the method comprising:
   capturing a plurality of images with a camera, wherein each image is associated with corresponding color channel data and depth data together comprising RGB-D data, represented together as 3D digital data;
   storing the 3D digital data corresponding to the plurality of images on a non-transitory computer readable medium;
   extracting grey values from the color channel data of the digital data of a selected image;
   creating image pyramids from the grey values and from the depth data of the 3D digital data of the selected image;
   predicting a camera pose of the selected image of the plurality of images;
   selecting a first subset of existing keyframes, wherein each existing keyframe comprises at least one 2D digital image with corresponding depth data and a corresponding pose, and wherein the first subset includes a number N of keyframes;
   in a first alignment, aligning the image pyramids of the selected image with each keyframe of the first subset of N existing keyframes, wherein each alignment step of the first alignment minimizes geometric and photometric alignment error between a keyframe and the selected image over six degrees of freedom of pose variation, yielding a quantity N of pose updates and a corresponding quantity N of overlap values with respect to the first subset of selected keyframes;
   computing a new camera pose estimate of the selected image using the quantity N of pose updates from the first alignment;
   creating a new keyframe from the digital data of the captured selected image using the new camera pose estimate according to a user command or when specified criteria related to the overlap values, the new camera pose estimate of the selected image, and the keyframe poses are met;
   after the new keyframe is created, selecting from the existing keyframes including the new keyframe a second subset of M keyframes that is equal to or different from the first subset of N keyframes and in a second alignment, aligning the new keyframe using the new camera pose estimate with each keyframe of the second subset of keyframes, wherein the second alignment minimizes alignment error between keyframe pairs over six degrees of freedom of pose variation, to yield a quantity M of pose updates and a quantity M of overlap values with respect to the second subset of keyframes;
   extending a keyframe pose graph by deciding for each keyframe of the selected first subset of keyframes and the selected second subset of keyframes whether a new link is added to the keyframe pose graph based in part on the overlap values of respective keyframes with the selected image; and
   linking the keyframes using the new links.

2. The method of claim 1 wherein the new keyframe is created upon user command from the digital data corresponding to the selected image, and the camera pose is equal to an identity matrix if the set of existing keyframes is empty or the camera pose is equal to the estimated camera pose of a previous localization iteration if the set of existing keyframes is non-empty.

3. The method of claim 1, further comprising requesting and loading digital data corresponding to an additional image from the camera or from the non-transitory computer readable medium and using the digital data corresponding to the additional image to repeat the extracting, creating, computing, predicting, and aligning steps of claim 1 to extend the pose graph.

4. The method of claim 3, further comprising representing a 3D model through a collection of spatially positioned and oriented keyframes of the keyframe pose graph.

5. The method of claim 1, further comprising correcting the digital data corresponding to depth data of the stored selected image for characteristics of the camera according to a predetermined camera calibration.

6. The method of claim 1, wherein the predicting of the camera pose of the selected image occurs using rotational data selected from the group comprising: a visual predictor based on image optical flow, data from a digital gyroscope, and a linear motion model; or a combination of rotational data selected from the group.

7. The method of claim 4, further comprising sending data for visualization of the plurality of images and of the 3D model to a graphics processing unit.

8. The method of claim 1, further comprising, after the step of computing the new camera pose estimate of the selected image, checking for a failure in alignment and if there is a failure in alignment, performing a re-localization procedure.

9. The method of claim 8, wherein if there is no failure in alignment, then preparing a real-time correctly oriented visualization in space of a saved 3D model for a user.

10. The method claim 1, wherein the new keyframe is created based at least in part on overlap between the selected image and a selection of keyframes.

11. The method of claim 10, wherein a decision to create a new keyframe is further determined from data comprising digital depth data from the selection of keyframes.

12. The method of claim 1, further comprising reprojecting depth data from the selected digital image into a plurality of keyframes, each reprojection using an estimate of a relative pose resulting from an alignment step of the depth data with a corresponding selected keyframe and a calibration model of the camera.

13. The method of claim 12, further comprising recomputing depth data for a selected keyframe using a combination of reprojected depth data and the existing depth data of the keyframe.

14. The method of claim 4, further comprising transforming the 3D model from a local coordinate system to another coordinate system using digital images of physical targets acquired within the image, wherein the target is selected from the group comprising: a checkerboard target; a QR code or QR-like code; and a user-selected point.

15. The method of claim 14, further comprising adding, updating, differencing or refining geometry of a pre-existing 3D model with data acquired from the camera using a spatial pose of a visible target for positioning and orientating the camera in space, the visible target being also present in the 3D model, the 3D model selected from the group comprising a plurality of digital images or keyframes, a spatial dataset and a CAD file.

16. The method of claim 14, wherein a position and an orientation of the camera for the selected image in the existing 3D model is determined based on a localization procedure using an alignment algorithm that minimizes geometric and photometric alignment error.

17. The method of claim 15, wherein the pre-existing 3D model is loaded either from a digital storage medium or from another computer accessible through a computer network.

18. The method of claim 1, further comprising appending an additional image to a set of linked keyframes, the additional image selected from the group comprising 3D data captured with the camera; 3-D data captured by a laser scanner; and data from a 3D model or CAD software.

19. The method of claim 4, further comprising representing the 3D model in a compressed manner by compressing digital image data of keyframes into a lossless format.

20. An apparatus for performing the method of claim 1 and for collecting a plurality of spatially positioned and oriented keyframes and representing the collection of spatially positioned and oriented keyframes as a 3D model, the apparatus comprising:
an RGB-D camera module for capturing and storing a plurality of digital images, the RGB-D camera module including a depth computation system for deriving depth information for a plurality of arbitrary points in the digital images in real time;
a handheld computer system having a processor, a display with user interface controls, and a communications module, wherein the processor is in communication with the camera module including the depth computation system; and
a non-transitory computer readable medium having encoded thereon a set of instructions executable by the processor to cause the RGB-D camera module with the depth computation system, the handheld computer system, and the communications module to perform one or more operations to gather the plurality of digital images and the depth information to form the 3D model, the 3D model suitable for presentation to a user on a user interface, the 3D model also suitable for appending additional data to update the 3D model.

21. A method for creating or extending a pose graph of keyframes from a moving camera wherein each keyframe comprises a 2D digital image with corresponding depth data and a corresponding pose, the method comprising:
capturing a plurality of images with a camera, wherein each image is associated with corresponding RGB-D data, represented together as 3D digital data;
storing the 3D digital data corresponding to the plurality of images on a non-transitory computer readable medium;
extracting gray values from image color channels of the digital data of a selected image;
creating image pyramids from the grey values and from depth data of the 3D digital data of the selected image;
predicting a camera pose of the selected image using rotational data selected from the group comprising: a visual predictor based on image optical flow, data from a digital gyroscope, and a linear motion model; or a combination of the rotational data from the group;
selecting a first subset of existing keyframes, wherein each existing keyframe comprises at least one 2D digital image with corresponding depth data and a corresponding pose and the first subset includes a number N of keyframes;
in a first alignment, aligning the image pyramids of the selected image with each keyframe of the first subset of N existing keyframes, wherein each alignment step of the first alignment minimizes geometric and photometric alignment error between a keyframe and the selected image over six degrees of freedom of pose variation, yielding a quantity N of pose updates and a corresponding quantity N of overlap values with respect to the keyframes;

computing a new camera pose estimate of the selected image using the quantity N of pose updates and the quantity N of overlap values from the first alignment;

creating a new keyframe from the digital data of the captured selected image using the new camera pose estimate according to a user command or when specified criteria related to the overlap values, the new camera pose estimate of the selected image, and the keyframe poses are met;

after the new keyframe is created, selecting from all existing keyframes a second subset of M keyframes that is equal to or different from the first subset of N keyframes and in a second alignment, aligning the new keyframe using the new camera pose estimate with each keyframe of the second subset of keyframes, wherein the second alignment minimizes alignment error between keyframe pairs over six degrees of freedom of pose variation, to yield a quantity M of pose values and a quantity M of overlap values; and extending a keyframe pose graph by deciding for each keyframe of the selected first subset of keyframes and the selected second subset of keyframes whether a new link is added to the keyframe pose graph based in part on the overlap values of respective keyframes with the selected image; and linking the keyframes using the new links.

\* \* \* \* \*